United States Patent
Kang et al.

(10) Patent No.: US 11,140,578 B2
(45) Date of Patent: Oct. 5, 2021

(54) METHOD AND APPARATUS FOR TRANSMITTING AND RECEIVING DATA USING MULTILINKS IN WIRELESS COMMUNICATION SYSTEM

(71) Applicant: Samsung Electronics Co., Ltd., Suwon-si (KR)

(72) Inventors: Seongryong Kang, Seongnam-si (KR); Jaehyun Hwang, Anyang-si (KR); Daejoong Kim, Yongin-si (KR); Sangheon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 16/314,940

(22) PCT Filed: Jul. 10, 2017

(86) PCT No.: PCT/KR2017/007352
§ 371 (c)(1),
(2) Date: Jan. 3, 2019

(87) PCT Pub. No.: WO2018/012824
PCT Pub. Date: Jan. 18, 2018

(65) Prior Publication Data
US 2019/0230554 A1    Jul. 25, 2019

Related U.S. Application Data

(60) Provisional application No. 62/360,732, filed on Jul. 11, 2016.

(30) Foreign Application Priority Data

May 30, 2017  (KR) .................. 10-2017-0066966

(51) Int. Cl.
*H04W 28/08* (2009.01)
*H04W 76/25* (2018.01)
(Continued)

(52) U.S. Cl.
CPC .......... *H04W 28/085* (2013.01); *H04L 45/24* (2013.01); *H04W 28/12* (2013.01); *H04W 76/15* (2018.02);
(Continued)

(58) Field of Classification Search
CPC ... H04W 28/085; H04W 76/25; H04W 76/15; H04W 28/12; H04W 40/12; H04W 28/08; H04W 40/00; H04L 45/24; H04L 45/12
See application file for complete search history.

(56) References Cited

U.S. PATENT DOCUMENTS 5,274,634 A * 12/1993 Babiarz .................. H04L 29/06
                                                                  370/422
7,610,330 B1   10/2009 Quinn et al.
(Continued)

FOREIGN PATENT DOCUMENTS

KR    10-2014-0053269 A    5/2014
WO    2011/100492 A1       8/2011
WO    2015/187285 A1       12/2015

OTHER PUBLICATIONS

Medical Devices WG, Multi-Channel Adaptation Protocol, Jun. 26, 2008, V10r00 (Year: 2008).*
(Continued)

Primary Examiner — Omar J Ghowrwal
(74) Attorney, Agent, or Firm — Jefferson IP Law, LLP

(57) ABSTRACT

The present disclosure relates to a communication method and system therefor for combining a 5G communication system, for supporting higher data transmission rates beyond a 4G system, with IoT technology. The present disclosure
(Continued)

can be applied, on the basis of 5G communication and IoT-related technologies, to intelligent services such as services related to a smart home, smart building, smart city, smart or connected car, health care, digital education, small businesses, security and safety. The communication method using multilinks in a wireless communication system according to a variety of embodiments of the present disclosure comprises the steps of: acquiring multilink control data; distributing transmission data to each link on the basis of the multilink control data; and transmitting, simultaneously or selectively, the distributed transmission data to each link. The embodiments are not limited to the above and other embodiments are possible.

14 Claims, 31 Drawing Sheets

(51) Int. Cl.

| | | |
|---|---|---|
| *H04L 12/707* | (2013.01) | |
| *H04W 76/15* | (2018.01) | |
| *H04W 28/12* | (2009.01) | |
| *H04W 40/12* | (2009.01) | |
| *H04L 12/721* | (2013.01) | |
| *H04W 40/00* | (2009.01) | |

(52) U.S. Cl.
CPC .............. *H04W 76/25* (2018.02); *H04L 45/12* (2013.01); *H04W 28/08* (2013.01); *H04W 40/00* (2013.01); *H04W 40/12* (2013.01)

(56) References Cited

U.S. PATENT DOCUMENTS

| | | |
|---|---|---|
| 7,787,370 B1 | 8/2010 | Aweya et al. |
| 2005/0174935 A1* | 8/2005 | Segel ................... H04W 88/06 370/228 |
| 2012/0093150 A1 | 4/2012 | Kini |
| 2013/0176988 A1* | 7/2013 | Wang ................... H04L 5/0053 370/331 |
| 2013/0194921 A1 | 8/2013 | Zhang et al. |
| 2015/0223074 A1* | 8/2015 | Prytz ................... H04W 28/08 370/235 |
| 2015/0351079 A1 | 12/2015 | Himayat et al. |
| 2016/0174107 A1 | 6/2016 | Kanugovi et al. |

OTHER PUBLICATIONS

Joachim Sachs et al: "Multi-access Management in Heterogeneous Networks", Wireless Personal Communications, Kluwer Academic Publishers, DO, vol. 48, No. 1, Nov. 24, 2007, pp. 7-32, XP019650471.
Extended European Search Report dated Mar. 26, 2019, issued in European Application No. 17827896.6.

* cited by examiner

FIG. 3

| D/C | State | R | R | R | MLAP SN | Oct 1 |
|-----|-------|---|---|---|---------|-------|
| MLAP SN ||||||  Oct 2 |
| MLAP SN ||||||  Oct 3 |

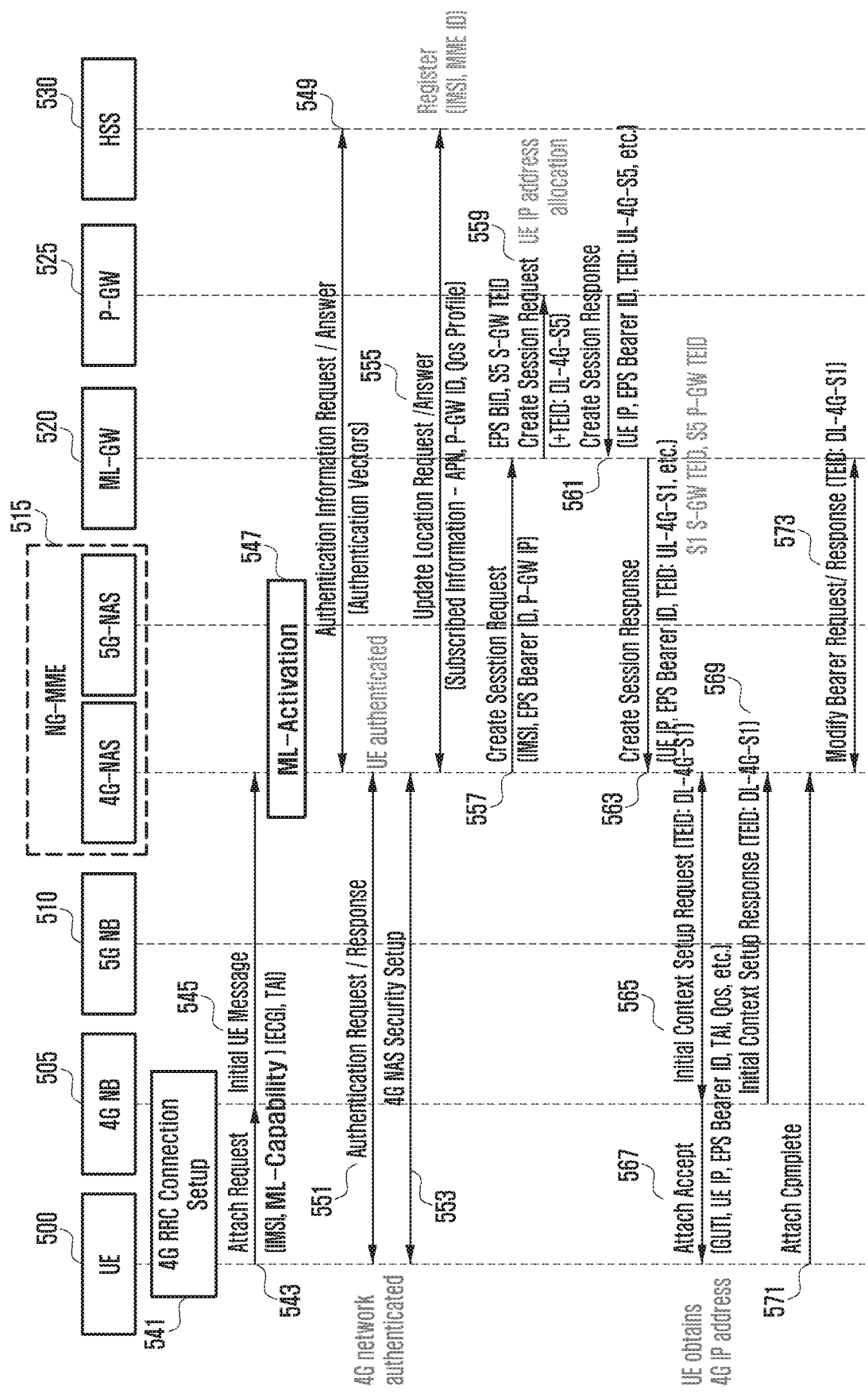

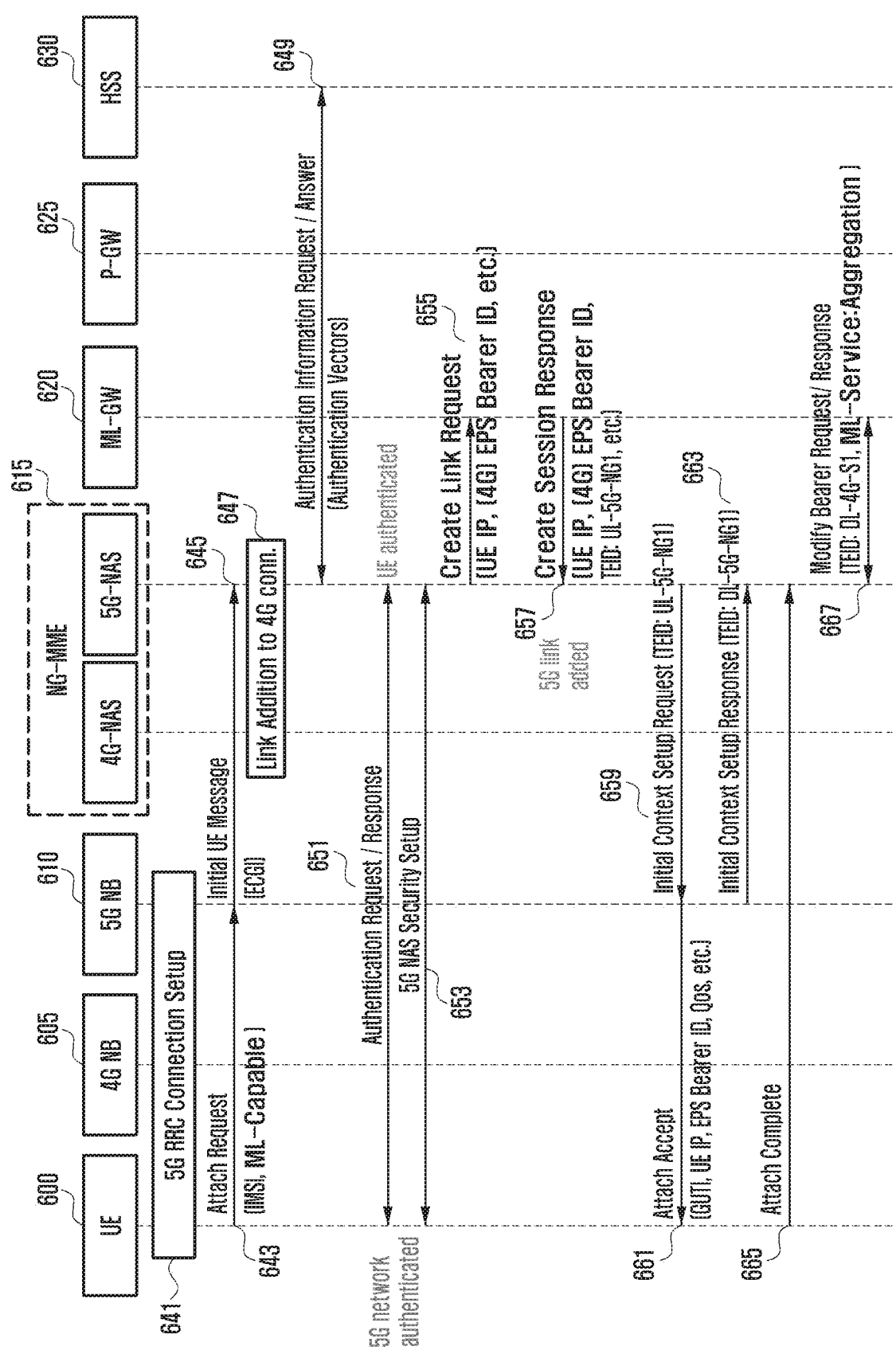

FIG. 7A

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Attach request message identity | Message type 9.8 | M | V | 1 |
| | EPS attach type | EPS attach type 9.9.3.11 | M | V | 1/2 |
| | NAS key set identifier | NAS key set identifier 9.9.3.21 | M | V | 1/2 |
| | EPS mobile identity | EPS mobile identity 9.9.3.12 | M | LV | 5-12 |
| | UE network capability | UE network capability 9.9.3.34 | M | LV | 3-14 |
| | ESM message container | ESM message container 9.9.3.15 | M | LV-E | 5-n |
| | ... | | ... | ... | ... |

FIG. 7C

```
<MS network capability value part> ::=

<GEA1 bits>
    <SM capabilities via dedicated channels: bit>
    <SM capabilities via GPRS channels: bit>
     <UCS2 support: bit>
    <SS Screening Indicator: bit string(2)>
    <SoLSA Capability: bit>
    <Revision level indicator: bit>
    <PFC feature mode: bit>
    <Extended GEA bits>
    <LCS VA capability: bit>
    <PS inter-RAT HO from GERAN to UTRAN Iu mode capability: bit>
    <PS inter-RAT HO from GERAN to E-UTRAN S1 mode capability: bit>
    <EMM Combined procedures Capability: bit>
    <ISR support: bit>
    <SRVCC to GERAN/UTRAN capability: bit>
    <EPC capability: bit>

<NF capability: bit>
    <GERAN network sharing capability: bit>
    <User plane integrity protection support: bit>
    <GIA/4: bit>
    <GIA/5: bit>
    <GIA/6: bit>
    <GIA/7: bit>
    <Spare bits>;
```

| D/C | Type | R | R | LN | Oct 1 |
|---|---|---|---|---|---|
| BW #1 | | | | | Oct 2 / Oct 3 |
| ... | | | | | |
| BW #LN | | | | | Oct (LN * 2) / Oct (LN * 2) + 1 |

FIG. 9C

| D/C | Type | R | R | LN | Oct 1 |
|---|---|---|---|---|---|
| A or F | | | | LID 1 | Oct 2 |
| A or F | | | | LID 2 | Oct 3 |
| ... | | | | | |
| A or F | | | | LID k | Oct k |

FIG. 10B

| bits | 4 3 2 1 | |
|---|---|---|
| | 0 0 0 0 | group call control |
| | 0 0 0 1 | broadcast call control |
| | 0 0 1 0 | EPS session management messages |
| | 0 0 1 1 | call control; call related SS messages |
| | 0 1 0 0 | GPRS Transparent Transport Protocol (GTP) |
| | 0 1 0 1 | mobility management messages |
| | 0 1 1 0 | radio resource management messages |
| | 0 1 1 1 | EPS mobility management messages |
| | 1 0 0 0 | GPRS mobility management messages |
| | 1 0 0 1 | SMS messages |
| | 1 0 1 0 | GPRS session management messages |
| | 1 0 1 1 | non call related SS messages |
| | 1 1 0 0 | Location services specified in 3GPP TS 44.071 [8a] |
| | 1 1 1 0 | Multilink management messages |
| | 1 1 1 1 | used by tests procedures described in 3GPP TS 44.014 [5a], 3GPP TS 34.109 [17a] and 3GPP TS 36.509 [26]. |

| 8 | 7 | 6 | 5 | 4 | 3 | 2 | 1 | |
|---|---|---|---|---|---|---|---|---|
| LS (1) | | | | LID (1) | | | | octet 3 |
| LS (2) | | | | LID (2) | | | | octet 4 |
| ... | | | | ... | | | | |
| LS (k) | | | | LID (k) | | | | octet k+2 |

METHOD AND APPARATUS FOR TRANSMITTING AND RECEIVING DATA USING MULTILINKS IN WIRELESS COMMUNICATION SYSTEM

TECHNICAL FIELD

The present disclosure relates to a multilink network transmission system for transmitting data using multiple homogeneous or heterogeneous radio access technology (RAT) network paths simultaneously or selectively in a wireless communication system.

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of the radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, there has been recent research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected cars, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

Known technologies for distributing and aggregating multiple links of LTE and Institute of Electrical and Electronics Engineers' (IEEE) 802.11 standards (WI-FI) paths at the transport layer are multipath TCP (MPTCP) and a method of aggregating data received through multiple TCP connections appropriately at the application layer.

DISCLOSURE OF INVENTION

Technical Problem

The conventional multilink distribution and aggregation technology has the drawbacks of difficulty in reflecting the link status of other access networks at the transport or application layer quickly and of being restricted to TCP on the transport layer and HTTP on the application layer.

The present disclosure aims to provide a system support system that is capable of effectively using transmission paths of multiple access networks in the 4G network and the 5G network that is recently under standardization as the next generation mobile communication network.

Solution to Problem

In accordance with an aspect of the present disclosure, a multilink-based communication method in a wireless communication system includes acquiring multilink control information, distributing transmission data to multiple links based on the multilink control information, and transmitting the distributed transmission data on the multiple links simultaneously.

In accordance with another aspect of the present disclosure, an electronic device of a wireless communication system supporting multilink transmission includes a transceiver configured to transmit and receive signals and at least one processor configured to control to acquire multilink control information, distribute transmission data to multiple links based on the multilink control information, and transmit the distributed transmission data on the multiple links simultaneously.

Advantageous Effects of Disclosure

The present disclosure is advantageous in terms of making it possible for selecting a path based on an operator's management policy, type of application flow, and per-access network path status. Also, the present disclosure is advantageous in terms of splitting a load of a certain access network and improving a data rate by allowing multilink-based traffic split and aggregation regardless of the type of the transport or application layer. Also, the present disclosure is advantageous in terms of selecting and aggregating paths according to the radio access network status and traffic flows, subscriber information, and an operator's policy.

BRIEF DESCRIPTION OF DRAWINGS

FIG. 3 is a diagram illustrating a multilink adaptation layer packet header format for a multilink support system according to an embodiment of the present disclosure;

FIG. 5 is a signal flow diagram illustrating a procedure for establishing an initial connection to a 4G network according to an embodiment of the present disclosure;

FIG. 6 is a signal flow diagram illustrating a procedure for establishing a 5G connection as a second connection in addition to a previously established 4G connection according to an embodiment of the present disclosure;

FIG. 7A is a diagram illustrating part of an attach request message conveyed in an NAS message according to an embodiment of the present disclosure;

FIG. 7C is a diagram illustrating part of an MS network capability value field according to an embodiment of the present disclosure;

FIG. 9B is a diagram illustrating a first type of a control message according to an embodiment of the present disclosure;

FIG. 9C is a diagram illustrating a second type of a control message according to an embodiment of the present disclosure;

FIG. 10B is a diagram illustrating an extended NAS message according to an embodiment of the present disclosure;

FIG. 10E is a diagram for explaining a value of a link status change information element according to an embodiment of the present disclosure;

MODE FOR THE INVENTION

Figure 1:
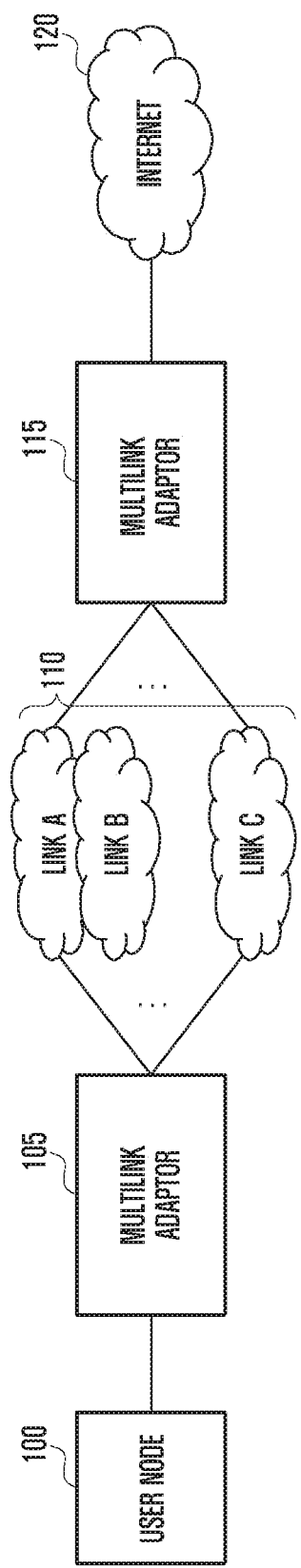
FIG. 1 is a conceptual diagram illustrating a multilink support system according to an embodiment of the present disclosure.

Exemplary embodiments of the present disclosure are described in detail with reference to the accompanying drawings. Various changes may be made to the disclosure, and the disclosure may have various forms, such that exemplary embodiments will be illustrated in the drawings and described in detail. However, such an embodiment is not intended to limit the disclosure to the disclosed exemplary embodiment and it should be understood that the embodiment includes all changes, equivalents, and substitutes within the spirit and scope of the disclosure. Throughout the drawings, like reference numerals refer to like components.

It will be understood that the expressions "comprises" and "may comprise" are used to specify the presence of a disclosed function, operation, component, etc., but they do not preclude the presence of one or more functions, operations, components, etc. It will be further understood that the terms "comprises" and/or "has" when used in this specification, specify the presence of a stated feature, number, step, operation, component, element, or a combination thereof, but they do not preclude the presence or addition of one or more other features, numbers, steps, operations, components, elements, or combinations thereof.

In the present disclosure, the expression "or" is taken as a specific disclosure of each and any combination of enumerated things. For example, A or B is to be taken as a specific disclosure of each of A, B, and A and B.

In the present disclosure, expressions such as "$1^{st}$" or "first," "$2^{nd}$" or "second", etc. may modify various elements of the present disclosure, but they do not limit the relevant elements. For example, these expressions do not limit a sequence and/or an importance of relevant elements. The expressions may be used for distinguishing one element from another element. For example, both a first user apparatus and a second user apparatus are all user apparatuses, and they represent different user apparatuses. For example, a first element may be referred to as a second element and, similarly, the second element may be referred to as the first element.

It will be understood that when an element or layer is referred to as being "on", "connected to," or "coupled to" another element or layer, it can be directly on, connected to, or coupled to the other element or layer or intervening elements or layers may be present. In contrast, when an element is referred to as being "directly on," "directly connected to," or "directly coupled to" another element or layer, there are no intervening elements or layers present.

The terminology used herein is for the purpose of describing particular embodiments only and is not intended to be limiting of the disclosure. As used herein, a singular form is intended to include plural forms as well, unless the context clearly indicates otherwise.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Although the description is directed to a case of the multilink made up of a 4G connection as the first link and a 5G connection as the second link by way of example, the present disclosure is not limited thereto, and it may be applicable for implementing multilink transmission with various homogeneous or heterogeneous radio access technology (RAT) links.

In the present disclosure, the term "electronic device" is intended to include user equipment and a core entity that support a multilink adaptation layer.

FIG. 1 is a conceptual diagram illustrating a multilink support system according to an embodiment of the present disclosure.

A user node 100 that connects to the Internet 120 for providing application services has a specific section, and the connection has a specific section composed of a plurality of links (Link-A, Link-B, and Link-C) 110 that are terminated at both ends by multilink adapters 105 and 115, which allow data transmission in various modes by use of the multiple links. Here, the links (Link-A, Link-B, and Link-C) 110 may be identical or different in RAT (e.g., LTE, 5G, and WI-FI).

Figure 2:
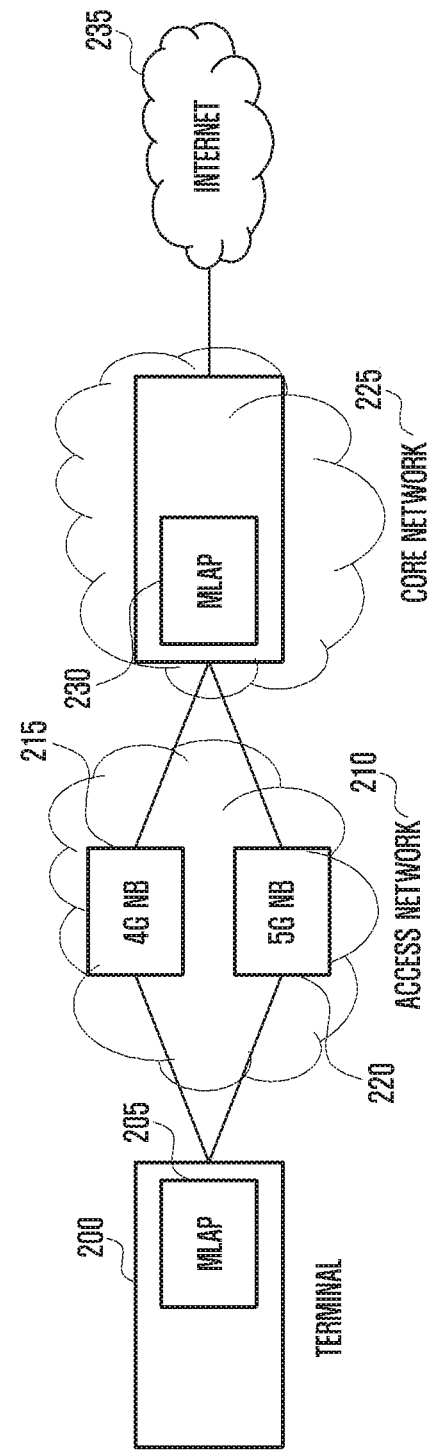
FIG. 2 is a diagram illustrating a cellular radio network including a 4G link and a 5G link for implementing a multilink support system according to an embodiment of the present disclosure.

FIG. 2 is a diagram illustrating a cellular radio network including a 4G link and a 5G link for implementing a multilink support system according to an embodiment of the present disclosure.

A user equipment (UE), e.g., terminal 200, and a core equipment 230 are connected through two links 210, one via a 4G node B (NB) 215 and the other via a 5G NB 220, and they include multilink adaptation protocol entities (MLAPs) 205 and 230 responsible for multilink adaptation layer functions for providing the multilink services. The terminal 200 may receive the application services from the Internet 235 through the two links 210.

The MLAP resided in the core network may be included in a 4G or 5G core gateway (GW) and, hereinafter, an evolved packet core (EPC) node of the core network including the MLAP as a multilink adaptation layer protocol is referred to as ML-GW for convenience of explanation.

According to an embodiment of the present disclosure, the MLAP layer of the receiver may estimate a path property per link and send the link property information to the MLAP layer of the transmitter. The MLAP layer of the transmitter may make a flow-based or packet-based path selection. The path selection determination may be made based on policy information, subscriber information, ISP information, and service and content type as well as the path characteristic information. The MLAP layer may acquire and share per-link radio state information with the MLAP layer of the core entity. The radio state information may also be used for path selection determination of the MLAP layer. Each of the UE or the core entity may operate as a transmitter or receiver depending on whether the transmission is uplink or downlink.

In various embodiments of the present disclosure, the MLAP operations at the transmitter and the receiver may be summarized as follows. In this specification, it is assumed that both the UE and the core entity support the multilink transmission, and the multilink supportability may be determined through initial NAS signaling. For backward compatibility, if one of the opposite sides does not support the multilink transmission, the MLAP layer is bypassed. If the two sides support the multilink transmission, an MLAP entity is established per bearer.

The functions of the MLAP entity of the transmitter are as follows.

Sequence numbering: Manage MLAP Sequence Number (SN)

Time stamping: Function of optionally adding timestamp information

Header compression (ROHC)

Add MLAP header: Add header containing MLAP SN information

Multi-link routing: Perform multilink routing, e.g., splitting and switching, according to current link connection state and policy For the above functions, the operations of the MLAP entity of the transmitter are as follows.

Link selection: Determine link to use and operation according to link preference, available link, UE status, and option policy per service Header compression (ROHC): Perform ROHC in advance on the MLAP layer because it is impossible to process a MLAP header on a PDCP layer. If an MLAP header exists, the PDCP does not perform ROHC.

MLAP header processing: Add MLAP header in the format depicted in FIG. 3.

Multi-link routing: split data based on path characteristic information provided by the MLAP entity of the receiver FIG. 3 is a diagram illustrating a multilink adaptation layer packet header format for a multilink support system according to an embodiment of the present disclosure. For example, the respective fields may contain information as follows.

D/C (1 bit): data or control

State (2 bits): single-link, multi-link, etc.

R: Reserved

MLAP SN (18 bits): MLAP sequence number (Timestamp field may be added optionally)

The functions of the MLAP entity of the receiver are as follows.

Path monitoring: Calculate bandwidth or delay per link

Link availability monitoring: Monitor for link becoming available or unavailable for use Remove MLAP header: Remove MLAP header and update related information Reordering: Reorder all packets according to MLAP SN Header decompression: Decompress compressed header For the above functions, the operations of the MLAP entity of the receiver are as follows.

Path monitoring: Estimate link bandwidth. It is possible to calculate relative one-way delay per link when the timestamp option is added.

Link availability monitoring: Measure per-link radio signal and connection state periodically to detect a link becoming available or unavailable for use Perform reordering based on MLAP SN The MLAP entity of the receiver may check for path status and link status and send the check result to the MLAP entity of the receiver. How to send the information is described in detail later.

Figure 4A:
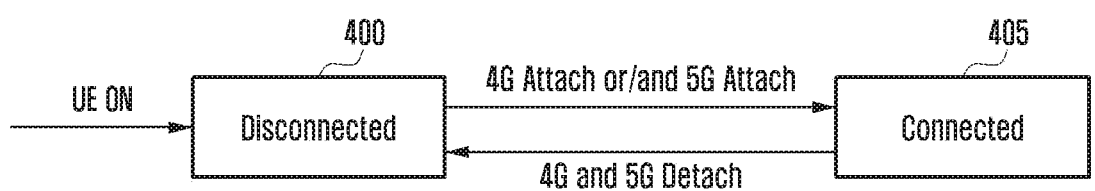
FIG. 4A is a diagram for explaining connection state transition of a UE in a multilink support system according to an embodiment of the present disclosure.

FIG. 4A is a diagram for explaining connection state transition of a UE in a multilink support system according to an embodiment of the present disclosure.

In the multilink system, a radio resource control (RRC) entity is established per link such that connection management is performed per connection. However, it may be possible to manage the connection state of the UE in an integral manner as shown in FIG. 4A.

The disconnected state 400 indicates that neither the 4G connection nor the 5G connection is established. The UE in the disconnected state 400 enters, if at least one of 4G and 5G connections is established, the connected state 405 and determines the link with the attachment based on an internal variable. The connection states are identical with the legacy RRC/ECM (EPS Session Management) states, and each link remains in Idle or connected state.

Figure 4B:
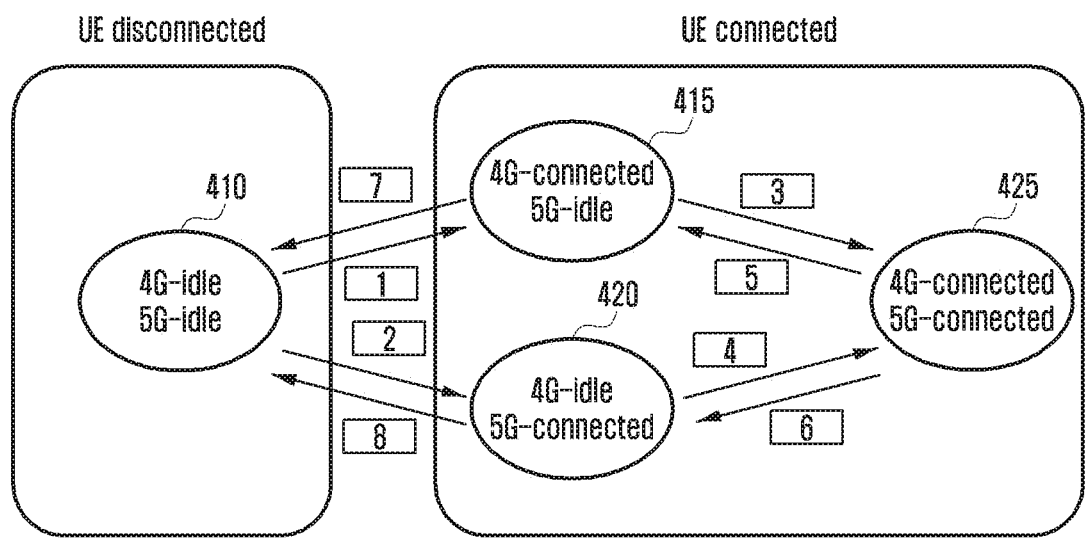
FIG. 4B is a diagram illustrating detailed state transitions of a UE in a multilink support system according to an embodiment of the present disclosure.

FIG. 4B is a diagram illustrating state transitions of a UE in detail, the transitions occurring stepwise (1-8) in an event-triggered manner as follows.

Figure 4C:
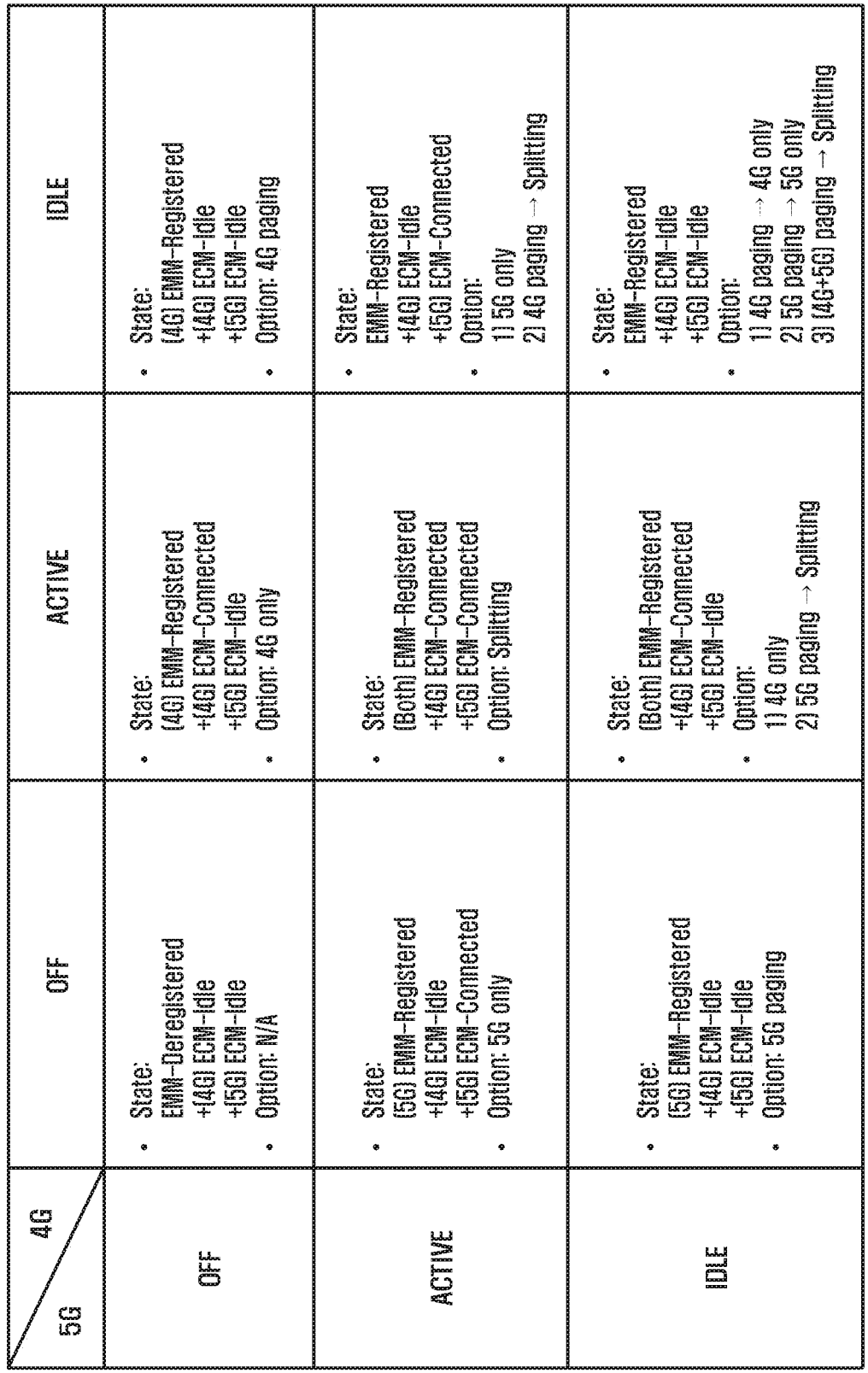
FIG. 4C is a diagram illustrating optional operations being performed in association with a connection state of a UE in a multilink support system according to an embodiment of the present disclosure.

1: 4G attach/service request in 4G and 5G idle state
2: 5G attach/service request in 4G and 5G idle state
3: 5G attach/service request in 4G connected and 5G idle state
4: 4G attach/service request in 4G idle and 5G connected state
5: 4G detach/inactivity/RLF in 4G and 5G connected state
6: 5G detach/inactivity/RLF in 4G and 5G connected state
7: 4G detach/inactivity/RLF in 4G connected and 5G idle state
8: 5G detach/inactivity/RLF in 4G idle and 5G connected state FIG. 4C is a diagram illustrating optional operations being performed, when actual traffic occurs, based on the above state transitions of the UE.

For example, when one of the two links is in the state of attachment (e.g., 4G EMM-Registered or 5G EMM-Registered), it is possible to perform transmission for the case where the corresponding link is in the RRC-Connected state or paging to allocate radio resources for the case where the corresponding link is in the RRC-Idle state.

It may be possible that both the links are in the state of attachment and, in this case, if both the links are in the RRC-Connected state, it may be possible to split data transmission. If one is connected and the other is idle, it may be possible i) to transmit data on only the connected link or ii) to wake up (page) the idle link by transmitting data on the connected link so as to perform splitting when both the links are in the connected state. Finally, if both the links are in the idle state, it may be possible i) to wake up one of the two links based on the user preference, policy, etc. to perform data transmission or ii) to page on both the links and then perform splitting.

According to an embodiment of the present disclosure, the attachment procedure differs between the case of establishing a link initially and the case of establishing a new link in addition to the previously established link.

FIG. 5 is a signal flow diagram illustrating a procedure for establishing an initial connection to a 4G network according to an embodiment of the present disclosure.

At step 541, a UE 500 may set up a 4G RRC connection with a 4G-NB 505. The UE 500 may transmit an attach request to the 4G-NB 505 at step 543, and the 4G-NB 505 may transmit an initial UE message including information on the attach request to a new generation-mobility management entity (NG-MME) 515 at step 545. The attach request and initial UE message may further include multilink support-related UE capability information (ML-Capability).

At step 547, the NG-MME 515 may detect the initial connection and check the ML-capability included in the Attach Request message to perform ML-activation. At steps 549 and 551, the 4G-NAS processing block of the NG-MIME 515 may perform a network authentication procedure in interoperation with an HSS 530. At step 553, the NG-MME 515 may complete the 4G-NAS setup with the UE 500. At step 555, the NG-MIME 515 may notify the HSS 530 of the connection of the UE thereto.

At steps 557 to 563, the NG-MME 515 may transmit a Create Session Request message to the ML-GW 520 to establish a 4G bearer via the ML-GW 520 and a P-GW 525. The NG-MIME 515 may transmit an initial context setup request message to the 4G-NB 505 at step 565, and the 4G-NB 505 may transmit an Attach Accept message to the UE 500 at step 567 upon receipt of the initial context setup request message. The 4G-NB 505 may transmit an initial context setup response message to the NG-MIME 515 at step 569, and the UE 500 may transmit an attach complete message to the NG-MIME 515 at step 571. Afterward, the NG-MIME 515 may perform a bearer modification procedure with the ML-GW 520 at step 573.

FIG. 6 is a signal flow diagram illustrating a procedure for establishing a 5G connection as a second connection in addition to a previously established 4G connection according to an embodiment of the present disclosure.

At step 641, a UE 600 may set up a 5G RRC connection with a 5G-NB 610. The UE 600 may transmit an attach request to the 5G-NB 610 at step 643, and the 5G-NB 610 may transmit an initial UE message including information on the attach request to an NB-MME 615 at step 645. The attach request and initial UE message may further include multilink support-related UE capability information (ML-Capability).

At step 647, the NG-MIME 615 may check the ML-capability included in the Attach Request message to internally perform link addition in addition to a 4G connection. A 5G-NAS processing block of the NG-MME 615 may perform a network authentication procedure in interoperation with an HSS 630 at steps 649 and 651 in a similar manner and complete the 5G-NAS setup with the UE 600 at step 653.

In this case, the NG-MIME 615 may detect the second connection and skip transmitting a session creation request message. Instead, the NG-MIME 615 may perform a newly defined Create Link process with the ML-GW 620, at steps 655 and 657, for binding with the previously established 4G connection to establish only a subordinated EUTRAN radio access bearer (E-RAB). The NG-MIME 615 may exchange Create Link request and response messages with the ML-GW 620, and these message may include a UE identifier (e.g., UE IP) and 4G bearer identifier (e.g., 4G EPS Bearer ID). That is, the ML-GW 620 may check the UE identifier and the 4G bearer identifier included in the message to bind the 5G link to the previously established 4G bearer.

The NG-MME 615 may transmit an initial context setup request message to the 5G-NB 610 at 659 and, upon receipt of this, the 5G-NB 605 may transmit an Attach Accept message to the UE 600 at step 661. The 5G-NB 610 may transmit an initial context setup response message to the NG-MME 615 at step 663, and the UE 600 may transmit an Attach Complete message to the NG-MME 615 at step 665. Afterward, the NG-MIME 615 may perform a bearer modification procedure with the ML-GW 620 at step 667. The NG-MME 615 may exchange Modify Bearer Request and Response messages with the ML-GW 620, and these message may include information indicating that the ML-Service is aggregated.

Figure 7B:
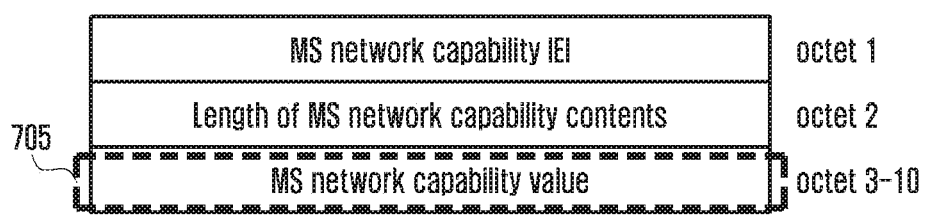
FIG. 7B is a diagram illustrating a format of a UE network capability information element according to an embodiment of the present disclosure.

FIGS. 7A to 7C are diagrams for explaining an NAS message extension for transmitting UE ML-capability.

The UE ML-capability information contained in the Attach Request message may be transmitted to the NG-MME by extending a legacy NAS message.

FIG. 7A shows part of the content of the Attach Request message being carried on the legacy NAS message. Here, an information element 700 indicating UE network capability consists of 3 fields as shown in FIG. 7B. FIG. 7C shows part of a MS network capability value field 705 of FIG. 7B. Here, it may be possible to add a UE ML-capability as follows using spare bits.

<ML/1>

0: Mobile station does not support Multilink functionality

1: Mobile station supports Multilink functionality

Figure 8A:
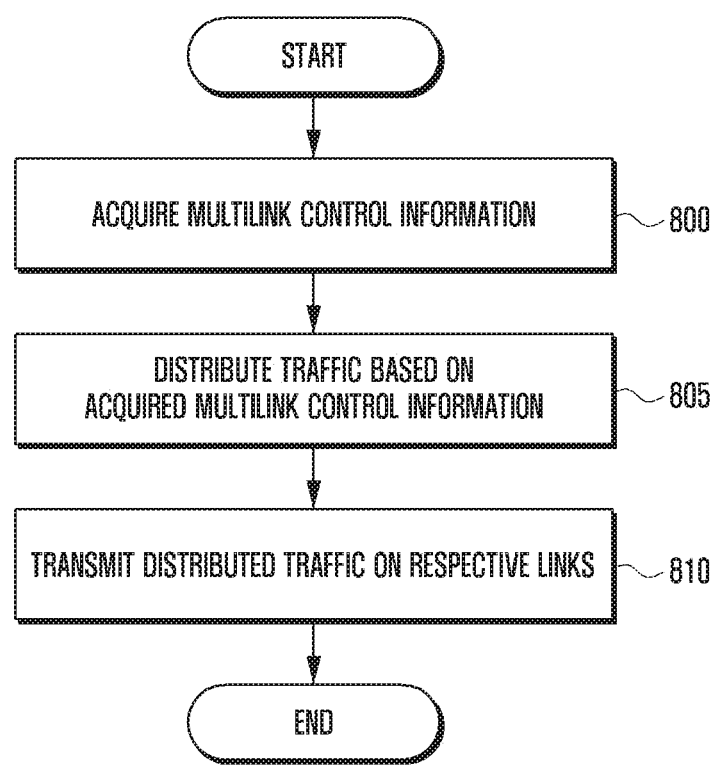
FIG. 8A is a flowchart illustrating a multilink data transmission method of an electronic device operating as a transmitter according to an embodiment of the present disclosure.

FIG. 8A is a flowchart illustrating a multilink data transmission method of an electronic device operating as a transmitter according to an embodiment of the present disclosure. The electronic device may include a UE as well as a core entity as described above.

At step 800, the electronic device may acquire multilink control information. In the MLAP layers, the UE and the core entity may exchange multilink control information for facilitating path selection.

The multilink control information may include radio state information and path characteristic information. The radio state information may include link failure, link availability, and radio link signal strength, and the path characteristic information may include per-link available bandwidth and delay information.

The radio state information may be collected by a link status analyzer of a UE's MLAP and sent to the MLAP layer of the core entity for notifying the core entity's MLAP layer of the state change of the radio link quickly to switch the packet transmission path promptly if necessary.

Meanwhile, the path characteristic information may be collected by a link characteristic estimator of the receiver's MLAP in such a way of monitoring each link and it is sent to the transmitter in order for the MLAP of the transmitter to select a transmission path per packet or flow in a way of maximizing the transmission efficiency.

The multilink control information may include at least one of policy information, subscriber information, flow information, internet service provider (ISP) information, and service type information.

Various multilink control information acquisition methods are described in detail hereinafter.

At step 805, the electronic device may distribute data traffic to the respective links based on the acquire multilink control information. Various embodiments of data traffic distribution methods are disclosed later.

At step 810, the electronic device may transmit the distributed data traffic on the respective links.

Figure 8B:
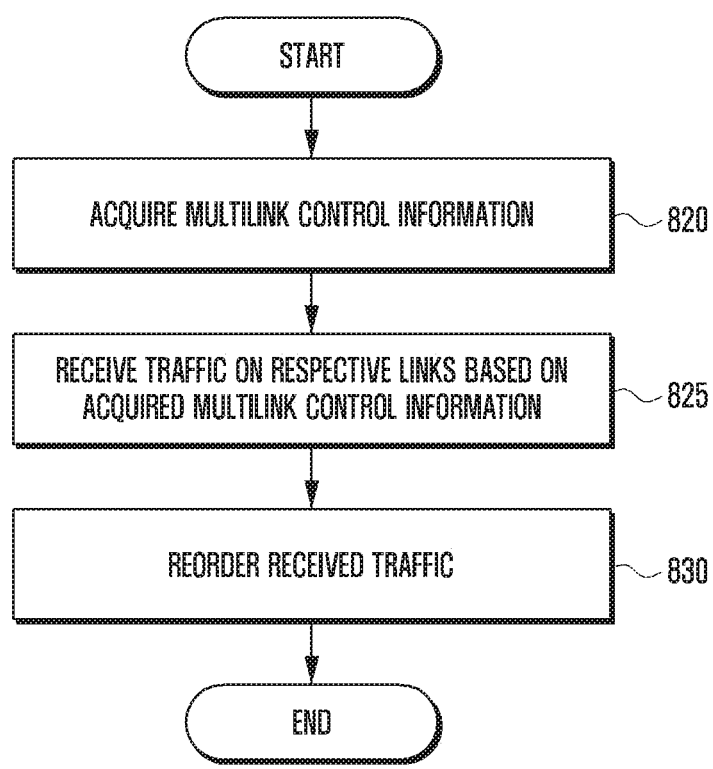
FIG. 8B is a flowchart illustrating a multilink data reception method of an electronic device according to an embodiment of the present disclosure.

FIG. 8B is a flowchart illustrating a multilink data reception method of an electronic device according to an embodiment of the present disclosure.

At step 820, the electronic device may acquire multilink control information. This is the same as described with reference to FIG. 8A.

At step 825, the electronic device may receive data traffic through the respective links based on the acquire multilink control information.

At step 830, the electronic device may reorder the received traffic using MLAP sequence numbers.

Figure 9A:
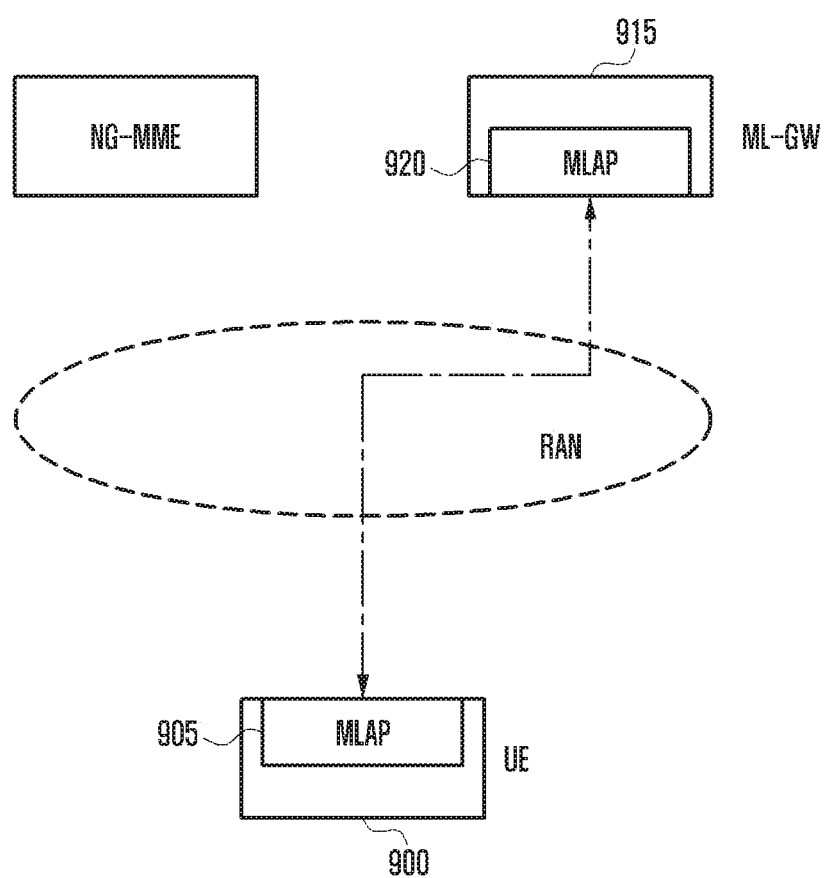
FIG. 9A is a diagram illustrating a control information exchange between MLAP layers according to an embodiment of the present disclosure.

FIG. 9A is a diagram illustrating a control information exchange between MLAP layers according to an embodiment of the present disclosure.

FIG. 9A depicts an exemplary control information exchange only with in-band signaling. This method is characterized in that the radio status information collected at the UE 900 and the path characteristic information are exchanged through in-band signaling between the MLAP layers 905 and 920 of the transmitter and the receiver. For example, the path characteristic information is transmitted in a control message format (Type 1) of FIG. 9B, and the radio status information collected by the UE is transmitted in a control message format (Type 2) of FIG. 9C.

In FIG. 9B, respective fields contain information as follows.

D/C (1 bit): data or control

Type (2 bits): 3GPP or Non-3GPP feedback, etc.

LN (3 bits): Number of links

BW (16 bits): bandwidth (in Mbps)

In FIG. 9C, respective fields contain information as follows.

D/C (1 bit): data or control

Type (2 bits): 3GPP or Non-3GPP

LN (3 bits): number of links

LID (8 bits): Link ID

A or F: (newly detected) link-availability or (newly detected) link-failure

Figure 10A:
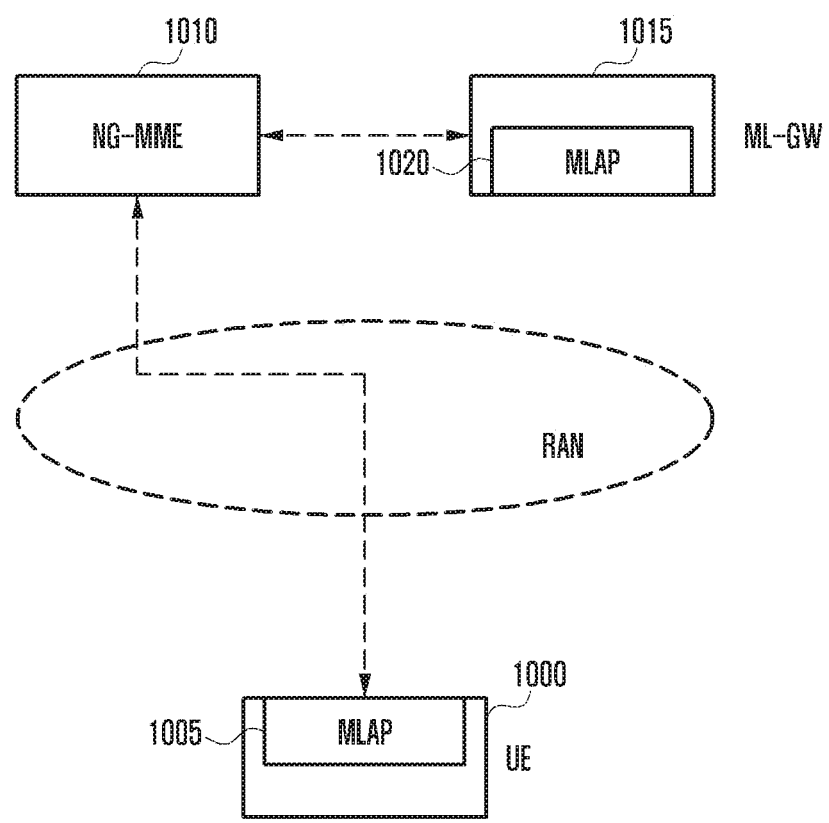
FIG. 10A is a diagram illustrating a control information exchange between MLAP layers according to an embodiment of the present disclosure.

FIG. 10A is a diagram illustrating a control information exchange between MLAP layers according to an embodiment of the present disclosure.

FIG. 10A depicts an exemplary control information exchange only with an NAS message. This exemplary control information exchange is performed in such a way that an MLAP 1005 of a UE 1000 may transmit collected radio status information and path characteristic information to an NG-MME 1010 via only the NAS message, which is relayed from the NG-MME 1010 to the MALP 1020 of an ML-GW 1015.

In order to accomplish this, it is necessary to extend a legacy NAS message. For example, it may be possible to use a reserved value of the legacy protocol discriminator for indicating multilink management 1030 as shown in FIG. 10B.

Figure 10C:
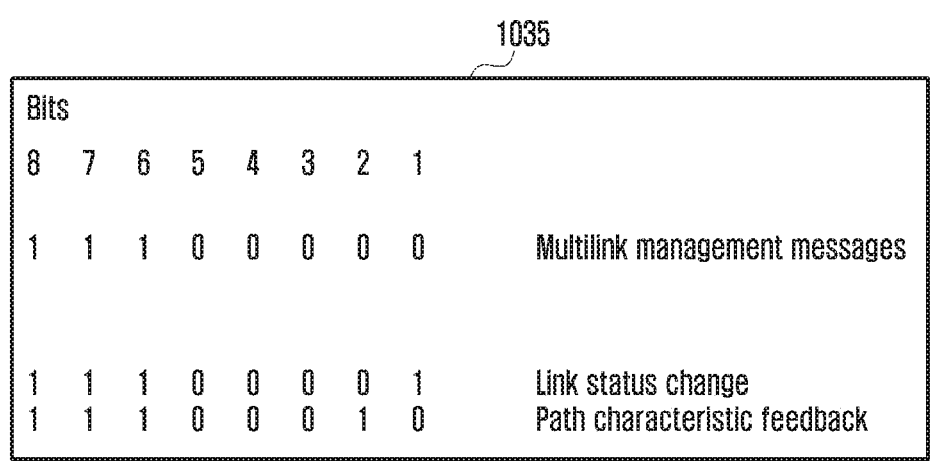
FIG. 10C is a diagram illustrating a message type of a newly defined multilink management message according to an embodiment of the present disclosure.

FIG. 10C is a diagram illustrating a message type field 1035 of the newly defined multilink management, which may include values indicative of Link status change and Path characteristic feedback. Here, the Link status change message aims to convey radio status information, and the Path characteristic feedback message aims to convey path characteristic information.

Figure 10D:
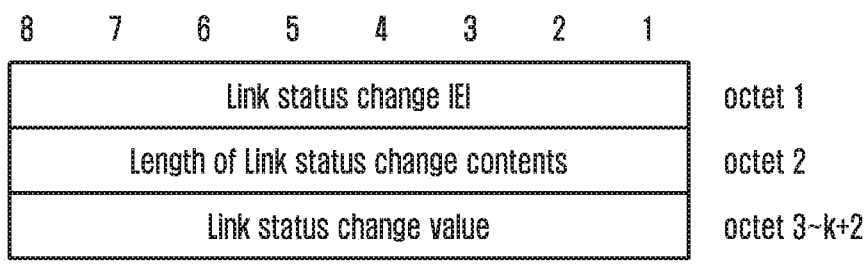
FIG. 10D is a diagram illustrating a format of a link status change information element according to an embodiment of the present disclosure.

The Link status change information element may be exemplified as shown in FIG. 10D. FIG. 10E exemplifies values of the Link status change information element. Fields LID (1) to LID (k) indicate IDs of the links classified as being newly available or failed. For example, LS (1) to LS (k) may be set to 0000 for "available" or 0001 for "failure" to indicate the state of newly state-changed link.

Figure 10F:
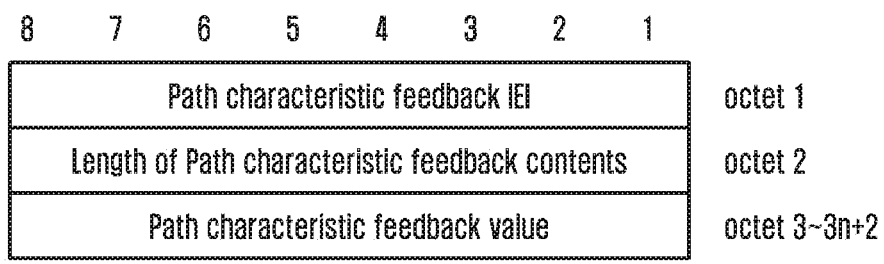
FIG. 10F is a diagram illustrating a format of a path characteristic feedback information element according to an embodiment of the present disclosure.
Figure 10G:
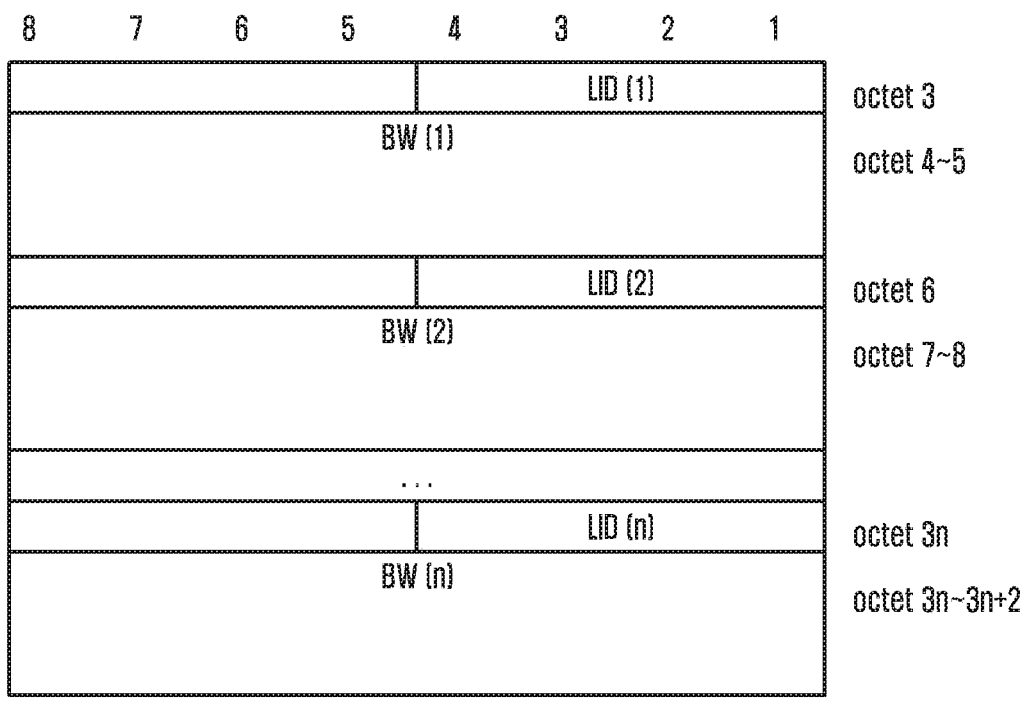
FIG. 10G is a diagram for explaining a value of a path characteristic feedback information element according to an embodiment of the present disclosure.

The Path characteristic feedback information element may be exemplified as shown in FIG. 10F. FIG. 10G exemplifies values of the Path characteristic feedback information element. Fields LID (1) to LID (n) indicate IDs of the links, and BW (1) to BW (n) may record bandwidth information of corresponding links.

Figure 11:
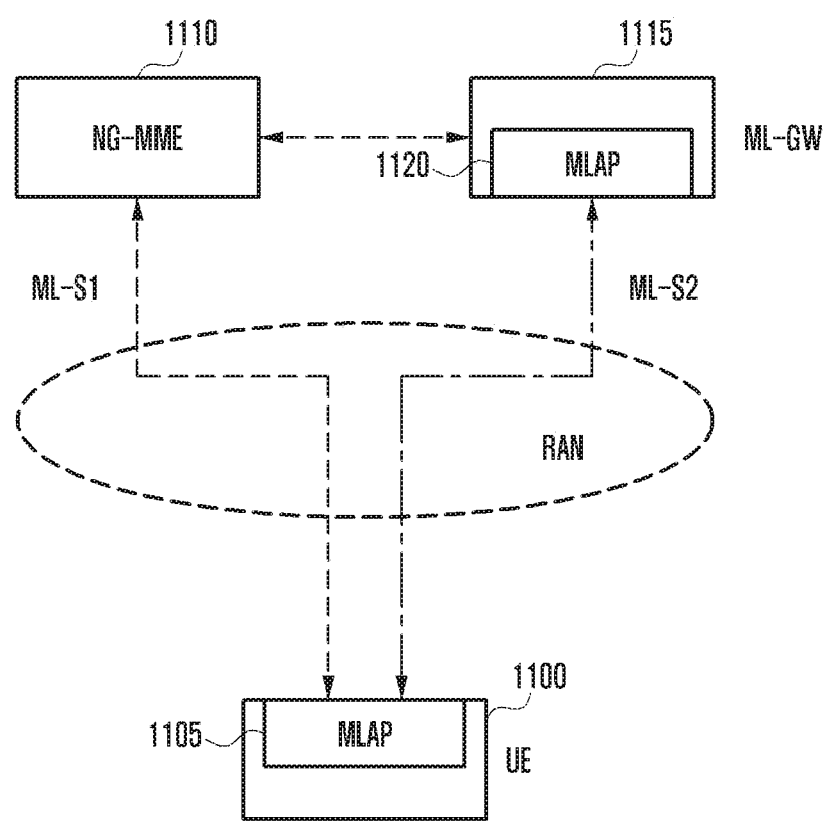
FIG. 11 is a diagram illustrating another exemplary control information exchange between MLAP layers according to an embodiment of the present disclosure.

FIG. 11 is a diagram illustrating another exemplary control information exchange between MLAP layers according to an embodiment of the present disclosure.

FIG. 11 depicts an exemplary control information exchange with both the NAS message and in-band message. The MLAP 1105 of the UE 1100 transmits the NAS message (ML-S1) including the collected radio status information and the in-band message (ML-S2) including the path characteristic information to the MLAP 1120 of the ML-GW 1115. Here, the ML-S1 NAS message may use the Link status change information element values as shown in FIG. 10E, and the ML-S2 in-band message may use the Type 1 control message format as shown in FIG. 9B.

Figure 12A:
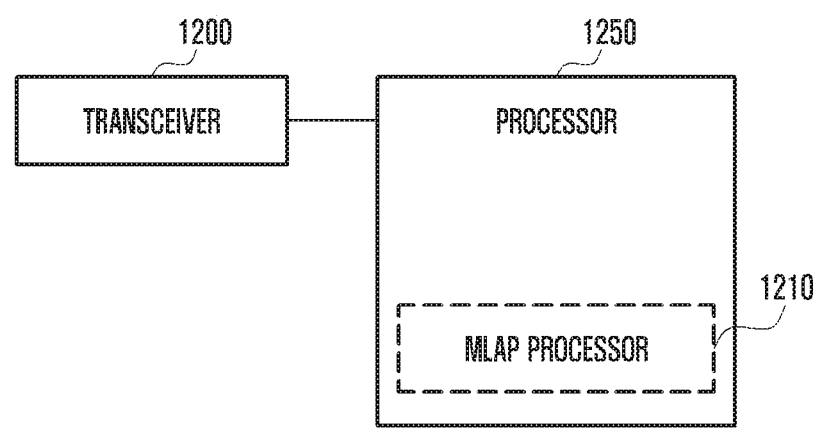
FIG. 12A is a block diagram illustrating a configuration of an electronic device supporting multilink transmission according to an embodiment of the present disclosure.
Figure 12B:
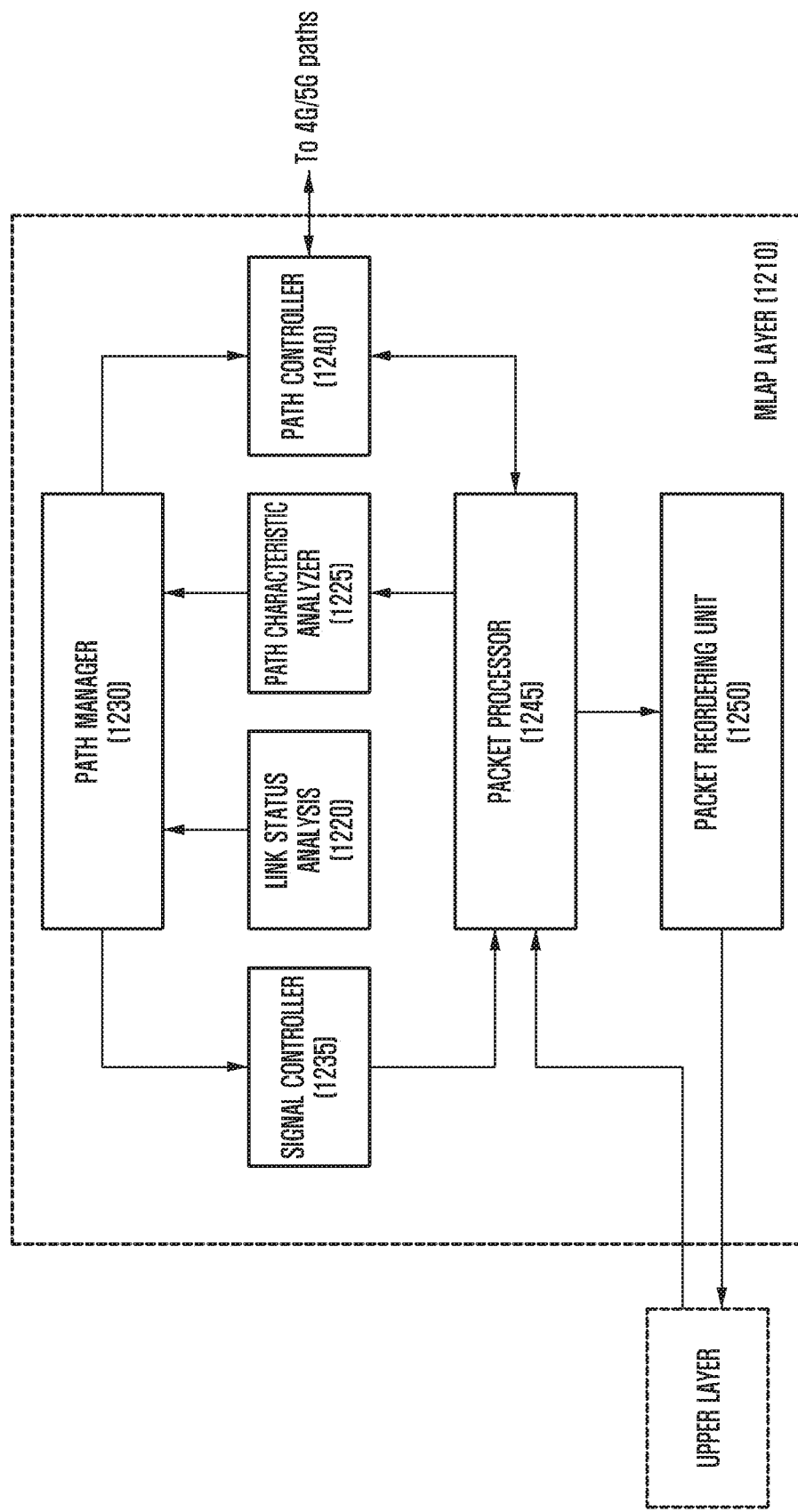
FIG. 12B is a block diagram illustrating a configuration of an electronic device supporting multilink transmission according to an embodiment of the present disclosure.

FIG. 12B is a block diagram illustrating a configuration of an electronic device supporting multilink transmission according to an embodiment of the present disclosure. As described above, the electronic device may include a UE and a core entity.

The electronic device may include a transceiver 1200 and at least one processor 1205.

The transceiver 1200 may communicate signals with an external device via a wireless link and/or a wired link under the control of the at least one processor 1205.

The at least one processor 1205 may control the multilink data transmission/reception operations according to various embodiments of the present disclosure. The at least one processor 1205 may perform the multilink connection operation described with reference to FIGS. 5 and 6 and the multilink data transmission/reception operation described with reference to FIGS. 8A and 8B. Here, the at least one processor 1205 may include an MLAP processor 1210 for performing the multilink data transmission/reception operation.

FIG. 12B is a block diagram illustrating components of a multilink adaptation layer in a multilink support system according to an embodiment of the present disclosure. FIG. 12B depicts the logical configuration of the MLAP layer included in the MLAP processor 1210 of FIG. 12A.

According to various embodiments of the present disclosure, the MLAP layer may include a link status analyzer 1220 for analyzing radio link status, a path characteristic estimator 1225 for estimating per-path characteristics, and a path manager 1230 for managing per-path link statuses and path characteristics. A signaling controller 1235 of the MLAP layer may control such that the multilink control information is shared between the MLAP layers of the UE and the core entity. The MLAP layer may also include a path controller 1240 for selecting a path per packet or flow based on the per-path status information provided by the path manager 1230, a packet processor 1245 for performing MLAP layer processing on the transmit and receive data packet and control signals, and a packet ordering unit 1250 for reordering received data packets.

Hereinafter, descriptions are made of the detailed operations of the path characteristic estimator in the MLCP layer of the receiver and per-packet and per-flow path selection operations in the MLCP layer of the transmitter according to an embodiment of the present disclosure.

One of the important path characteristic information factors is available bandwidth information. This is because the available bandwidth information is used for determining how many packets to be assigned to which paths. In an embodiment of the present disclosure, it may be possible to measure a packet reception rate of packets arriving at the receiver and use the measurement value as the available bandwidth value, by way of example, instead of directly estimating the available bandwidth of the radio link.

The packet reception rate may be calculated as follows.

The packet reception rate measured at time tk is calculated as follows.

$$\hat{R}_a(k) = \frac{1}{t_k - t_{k-1}} \sum_{j=1}^{n} s_j$$

Here, n denotes a number of packets received during a time period of [tk−1, tk], and sj denotes a size of the jth packet.

The packet reception rate measured at time k is calculated as follows.

$$R_a(k) = (1-\alpha)R_a(k-1) + \alpha\hat{R}_a(k)$$

Here, "a" is a parameter adjustable in a range of $0 \leq a < 1$, e.g., ⅛.

Figure 13A:
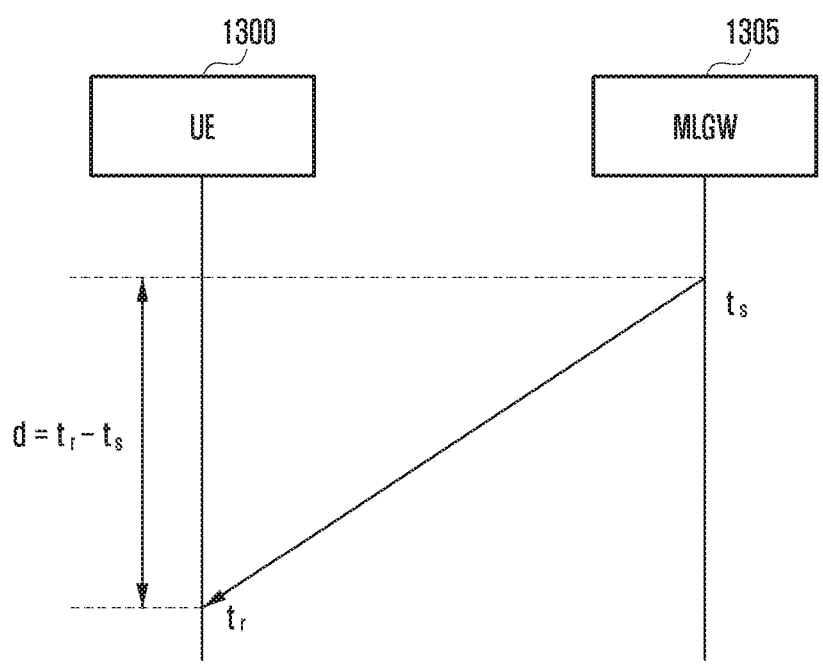
FIG. 13A is a diagram illustrating a per-link unidirectional delay measurement method according to an embodiment of the present disclosure.

Another important path characteristic information factor is delay information. The per-path delay information may be used for packet distribution to reduce packet reordering overhead and also to meet a specific policy and QoS requirement FIG. 13A is a diagram illustrating a per-link unidirectional delay measurement method according to an embodiment of the present disclosure. An MLAP of a transmitter (e.g., ML-GW 1305) may transmit an MLAP header or tail with an option field containing a transmission time ts. Then, the MLAP of a receiver (e.g., UE 1300) may calculate the unidirectional delay time d by subtracting the packet reception time tr from the transmission time ts.

Figure 13B:
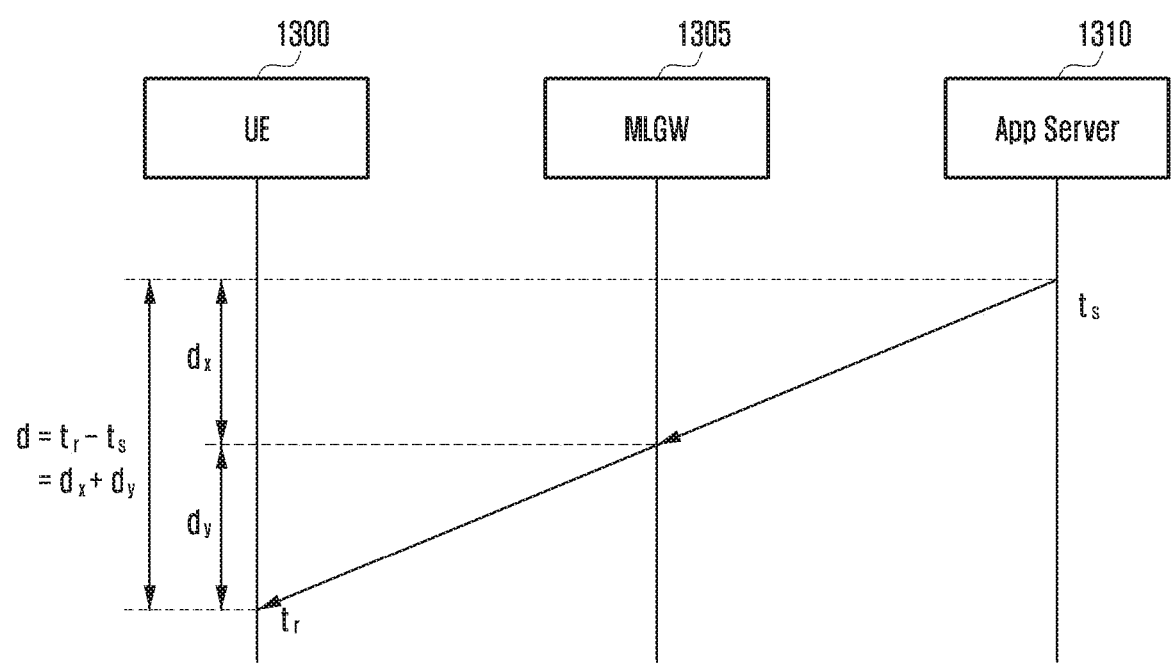
FIG. 13B is a diagram illustrating a per-link unidirectional delay measurement method according to another embodiment of the present disclosure.

In the case of a TCP-based application packet, it may be possible to estimate the unidirectional delay using a TCP timestamp option as shown in FIG. 13B. If an App server 1310 transmits the TCP timestamp indicating the transmission time ts, the ML-GW 1305 may relay this to the UE 1300. The MLAP of the UE 1300 may calculate the unidirectional delay time d(dx+dy) by subtracting the transmission time ts from the packet reception time tr. In this case, although the estimated unidirectional delay time may differ from the actual unidirectional delay between the ML-GW 1305 and the UE 1300, it may be used if the delay between the App server 1310 and the ML-GW 1305 is not greater than the delay between UE 1300 and the ML-GW 1305.

Figure 14A:
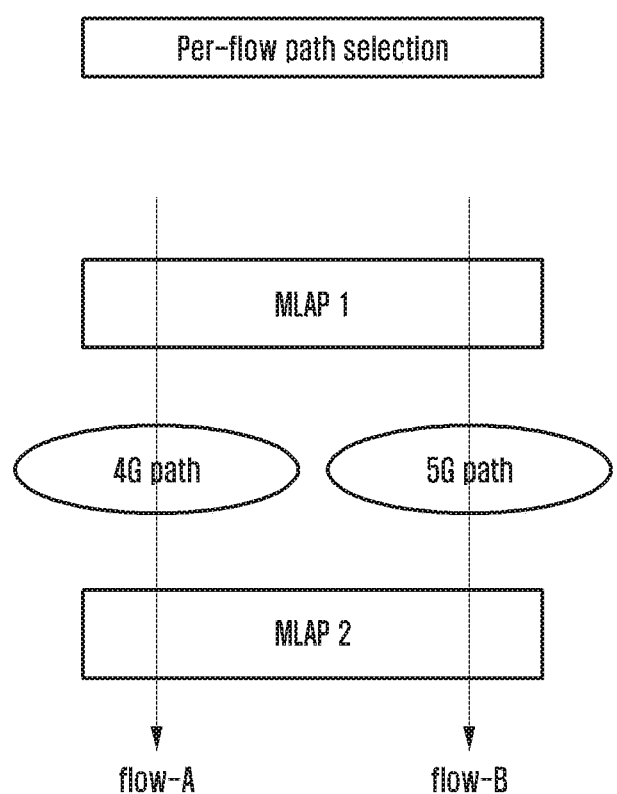
FIG. 14A is a diagram illustrating a per-flow path selection operation for traffic distribution in a multilink support system according to an embodiment of the present disclosure.
Figure 14B:
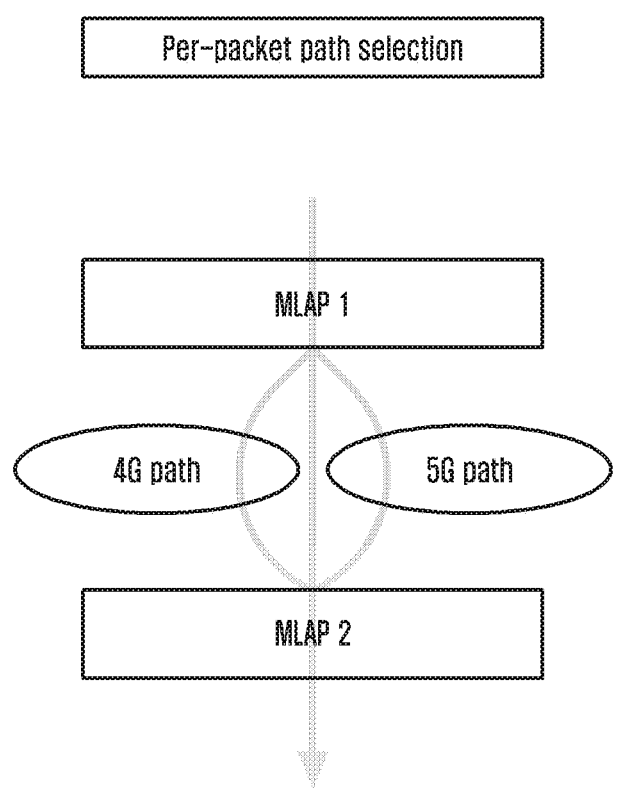
FIG. 14B is a diagram illustrating a per-packet path selection operation for traffic distribution in the multilink support system according to another embodiment of the present disclosure.

FIG. 14A is a diagram illustrating a per-flow path selection operation for traffic distribution in a multilink support system according to an embodiment of the present disclosure, and FIG. 14B is a diagram illustrating a per-packet path selection operation for traffic distribution in the multilink support system according to another embodiment of the present disclosure.

The per-flow path selection is made based on an operator's service policy, subscriber information, flow information, and/or service type such that a specific flow traverses a specific path. For this purpose, the MLAP of the core entity may interoperate with other core nodes such as PCRF, HSS, and ANDSF to acquire various items of information such as policy information, subscriber information, ISP information, and service type information for use in selecting a path.

In the per-flow path selection scheme, a packet being transmitted in a flow is not transmitted in other flows. In the per-packet path selection scheme, the packets belonging to a flow may be dynamically split to be transmitted on multiple paths. This packet splitting scheme aims to improve throughput using multiple links. Here, it is the splitting algorithm for determining how many packets to be assigned to respective links and the minimization of the number of out-of-order packets that are important.

For per-packet path selection, it may be possible to use various splitting algorithms such as the weighted round-robin (WRR) that assigns the packets as much as the fraction of a specific weight to a specific path. Although an algorithm is not described in detail in this specification, the description is made with an exemplary available bandwidth-based generic packet splitting method. Assuming that there are two paths P1 and P2 that respectively have available bandwidths of A1 and A2, the algorithm operates as follows.

Estimate A1 and A2, the respective available bandwidths of paths P1 and P2
Compute following expected values $$E(P1)=E(A1)/(E(A1)+E(A2))$$

$$E(P2)=E(A2)/(E(A1)+E(A1))$$

Upon arrival of each packet
Sends packets on path P1 with probability E(P1)
Sends packets on path P2 with probability E(P2)

The generic algorithm based on bandwidth and delay may operate as follows.

Estimate A1 and A2, the respective available bandwidths of paths P1 and P2
Compute following expected values $$E(P1)=E(A1)/(E(A1)+E(A2))$$

$$E(P2)=E(A2)/(E(A1)+E(A1))$$

Estimate RTT or one-way delay D1 and D2 of each path
Compute the following $$P(X=P1)=F(A1,A2,D1,D2)$$

$$P(X=P2)=F(A1,A2,D1,D2)$$

Upon arrival of each packet
Sends packets on path P1 with probability P(X=P1)
Sends packets on path P2 with probability P(X=P2)

If the characteristic difference between multiple links is out of a predetermined range, it may be possible to select the best path for packet transmission and, if not, to distribute the packets according to the two distribution methods described above.

Figure 15:
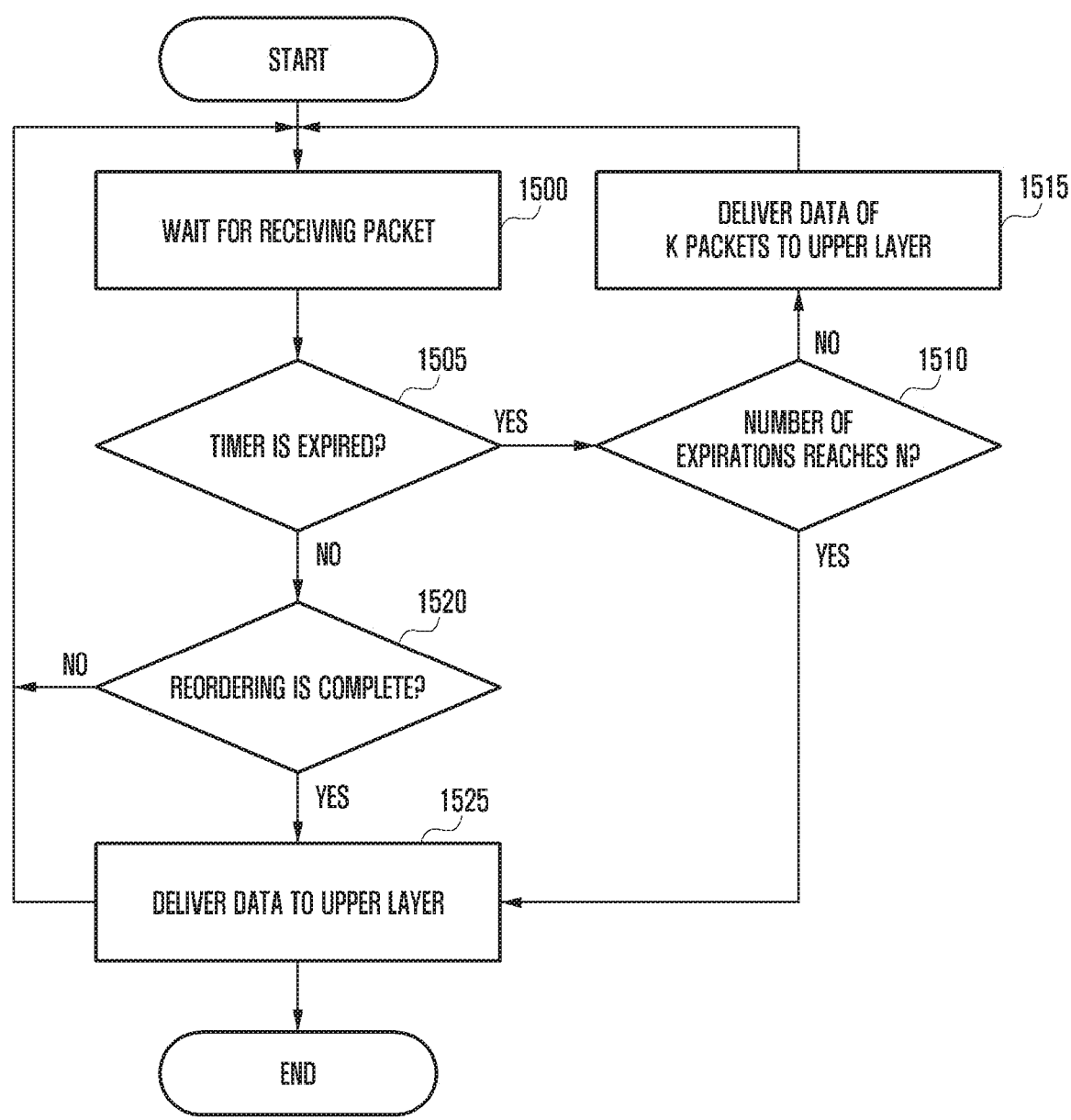
FIG. 15 is a flowchart illustrating a method for reordering received data in a multilink support system according to an embodiment of the present disclosure.

FIG. 15 is a flowchart illustrating a method for reordering received data in a multilink support system according to an embodiment of the present disclosure.

The MLAP layer of the receiver reorders the packets arriving through multiple paths based on the MLAP sequence numbers. The receiver waits at step 1500 for receiving packets, determines at step 1505 whether a reordering timer is expired, and determines at step 1510 whether a number of expirations reaches a predetermined value N. For example, if N=3 and the number of expirations reaches N, the receiver may deliver (release) all packets accumulated in the reordering buffer at step 1525 to the upper layer and, if not, deliver (release) a predetermined number (k) of packets to the upper layer whenever the timer expires. Here, k is an arbitrary value that can be changed and may be set to 1 by way of example.

If a new packet arrive at step 1505 before the reordering timer expires, the receiver may perform reordering with the received packet based on the MLAP sequence at step 1520 and deliver (release) the reordered, i.e., in-order, packets to the upper layer at step 1525 and restart the reordering timer.

The above enumerated components of the electronic device of the present disclosure may be implemented with one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

The term "module" according to the embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of a component or a part thereof. The term "module" may be the smallest unit of performing at least one function or a part thereof. A module may be implemented mechanically or electronically. For example, a module may include at least one of Application-Specific Integrated Circuit (ASIC) chip, Field-Programmable Gate Arrays (FPGAs), and Programmable-Logic Device known or to be developed for certain operations.

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A multilink-based communication method of a transmitter in a wireless communication system, the method comprising:
receiving, by a multilink adaptation protocol (MLAP) layer of a transmitter, multilink control information from a MLAP layer of a receiver;
identifying whether a difference of characteristic values between multiple links is greater than a predetermined value;
determining, by the MLAP layer of the transmitter, transmission data distribution to the multiple links based on the multilink control information in case that the difference of characteristic values between the multiple links is not greater than the predetermined value, the multiple links associating with a plurality of radio access technology (RAT) types;
transmitting the distributed transmission data on the multiple links simultaneously;
selecting one path from the multiple links in case that the difference of characteristic values between the multiple links is greater than the predetermined value; and
transmitting data on the selected path.

2. The method of claim 1, wherein the multilink control information comprises per-link radio status information and path characteristic information, the per-link status information comprising at least one of signal strength, link availability, and link failure, and the per-link path characteristic information comprising at least one of available bandwidth and path delay.

3. The method of claim 2, wherein the multilink control information further comprises at least one of policy information, subscriber information, flow information, Internet service provider (ISP) information, and service type information.

4. The method of claim 2, wherein the determining further comprises:
  determining the transmission data distribution by unit of data flow based on the multilink control information.

5. The method of claim 1, wherein the determining further comprises:
  determining the transmission data distribution by unit of data packet based on the multilink control information.

6. The method of claim 1, further comprising:
  receiving data simultaneously or selectively on the respective links based on the multilink control information; and
  reordering received traffic.

7. The method of claim 1, wherein the multilink control information is received via at least one of in-band signaling or NAS signaling.

8. An electronic device of a wireless communication system supporting multilink transmission, the electronic device comprising:
  a transceiver; and
  at least one processor, at a multilink adaptation protocol (MLAP) layer of an electronic device, configured to:
    control the transceiver to receive multilink control information from a MLAP layer of a receiver,
    identify whether a difference of characteristic values between multiple links is greater than a predetermined value,
    control to determine, at the MLAP layer of the electronic device, transmission distribution data to the multiple links based on the multilink control information in case that the difference of characteristic values between the multiple links is not greater than the predetermined value, the multiple links associating with a plurality of radio access technology (RAT) types,
    control the transceiver to transmit the distributed transmission data on the multiple links simultaneously,
    select one path from the multiple links in case that the difference of characteristic values between the multiple links is greater than the predetermined value, and
    control the transceiver to transmit data on the selected path.

9. The electronic device of claim 8, wherein the multilink control information comprises per-link radio status information and path characteristic information, the per-link status information comprising at least one of signal strength, link availability, and link failure, and the per-link path characteristic information comprising at least one of available bandwidth and path delay.

10. The electronic device of claim 9, wherein the multilink control information further comprises at least one of policy information, subscriber information, flow information, Internet service provider (ISP) information, and service type information.

11. The electronic device of claim 9, wherein the at least one processor is configured to control to distribute the transmission data by unit of data flow based on the multilink control information.

12. The electronic device of claim 8, wherein the at least one processor is configured to control to determine the transmission data distribution by unit of data packet based on the multilink control information.

13. The electronic device of claim 8, wherein the at least one processor is configured to control the transceiver to receive data simultaneously or selectively on the respective links based on the multilink control information and reorder received traffic.

14. The electronic device of claim 8, wherein the multilink control information is received via at least one of in-band signaling or NAS signaling.

* * * * *